US011880880B1

(12) United States Patent
Liu et al.

(10) Patent No.: US 11,880,880 B1
(45) Date of Patent: Jan. 23, 2024

(54) FACILITATING PURCHASE OF ITEMS DEFINED BY USER-CREATED ITEM LISTS

(71) Applicant: Amazon Technologies, Inc., Seattle, WA (US)

(72) Inventors: Guang Liu, Sammamish, WA (US); Shashank Agarwal, Seattle, WA (US); Andrew Michael Nienhaus, Seattle, WA (US); Ruimin Zhang, Issaquah, WA (US); Gabriela Sudirja, Seattle, WA (US); Laura Vig, Seattle, WA (US); Isha Vinod Pendke, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 128 days.

(21) Appl. No.: 17/204,199

(22) Filed: Mar. 17, 2021

(51) Int. Cl.
*G06Q 30/00* (2023.01)
*G06Q 30/0601* (2023.01)
*G06F 3/16* (2006.01)
*G06F 16/2457* (2019.01)

(52) U.S. Cl.
CPC ......... *G06Q 30/0641* (2013.01); *G06F 3/167* (2013.01); *G06F 16/24575* (2019.01); *G06Q 30/0625* (2013.01); *G06Q 30/0631* (2013.01); *G06Q 30/0633* (2013.01)

(58) Field of Classification Search
CPC ............. G06F 3/167; G06F 16/24575; G06Q 30/0633; G06Q 30/0625; G06Q 30/0631; G06Q 30/0641
See application file for complete search history.

(56) References Cited

U.S. PATENT DOCUMENTS

| 6,167,383 | A  | * | 12/2000 | Henson | G06Q 10/087 705/26.7 |
| 9,361,640 | B1 | * | 6/2016  | Donsbach | G06Q 30/0633 |
| 2009/0006373 | A1 | * | 1/2009 | Chakrabarti | G06F 16/335 707/999.005 |

(Continued)

OTHER PUBLICATIONS

"Dash Offers Amazon New Power in the Home—If it Catches On: Do Devoted Buttons Lock in Brand Loyalty or Just Limit the Appeal?" by Jack Neff, Advertising Age 86.11:26. Crain Communications, Incorporated (May 18, 2015) (Year: 2015).*

*Primary Examiner* — Anne M Georgalas
(74) *Attorney, Agent, or Firm* — Thomas | Horstemeyer, LLP

(57) ABSTRACT

Disclosed are various embodiments for providing an efficient and time-saving shopping experience by allowing a user to initiate a purchase of items corresponding to items included in an item list (e.g., shopping list) while minimizing user interactions. A user may initiate a shopping experience via a voice command and/or an interaction with a user interface associated with a list management service. Using keywords included in the item list, a list of recommended items that correspond to items included in the shopping list and are available for purchase at a particular store can be determined and presented to the user. Item listings may be preselected for purchase based at least in part on a determined likelihood that the user will purchase the item. The user can review the recommended items and select a purchase component (e.g., add-to-cart component, buy component), that upon selection, initiates the purchase of the selected items.

20 Claims, 10 Drawing Sheets

(56) References Cited

U.S. PATENT DOCUMENTS

| | | | | |
|---|---|---|---|---|
| 2010/0262554 | A1* | 10/2010 | Elliott | H04W 4/024 345/173 |
| 2011/0246332 | A1* | 10/2011 | Alcodray | G06Q 30/0641 705/27.1 |
| 2012/0123673 | A1* | 5/2012 | Perks | G06Q 30/0625 705/26.7 |
| 2013/0311328 | A1* | 11/2013 | Chien | G06Q 30/0207 705/26.9 |
| 2013/0325653 | A1* | 12/2013 | Ouimet | G06F 7/08 705/26.7 |
| 2013/0339190 | A1* | 12/2013 | Yu | G06Q 30/0633 705/26.62 |
| 2014/0081798 | A1* | 3/2014 | Millstone-Shroff | G06Q 50/01 705/26.7 |
| 2014/0095285 | A1* | 4/2014 | Wadell | G06Q 30/00 705/26.7 |
| 2014/0249966 | A1* | 9/2014 | Zaragoza | G06Q 30/0635 705/26.81 |
| 2015/0149298 | A1* | 5/2015 | Tapley | G06Q 30/0633 705/14.66 |
| 2015/0220979 | A1* | 8/2015 | Ouimet | G06Q 30/0633 705/14.49 |
| 2017/0270559 | A1* | 9/2017 | Zimmerman | G06Q 30/0238 |
| 2017/0372401 | A1* | 12/2017 | Wang | G06Q 30/0631 |
| 2019/0187864 | A1* | 6/2019 | Yeh | G06Q 30/0641 |
| 2021/0233143 | A1* | 7/2021 | Cho | G06Q 30/0641 |
| 2021/0233145 | A1* | 7/2021 | Joshi | G06Q 10/06393 |

* cited by examiner

FACILITATING PURCHASE OF ITEMS DEFINED BY USER-CREATED ITEM LISTS

BACKGROUND

Users may generate shopping lists to keep track of items that they may wish to purchase at a future time. However, when the user is ready to purchase the items on the shopping list, the user must search for the individual items at the online store and/or brick-and-mortar store. This additional step can be an inconvenience to the user as the user may have difficulty finding the items and/or tracking the items he or she has found on the list.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
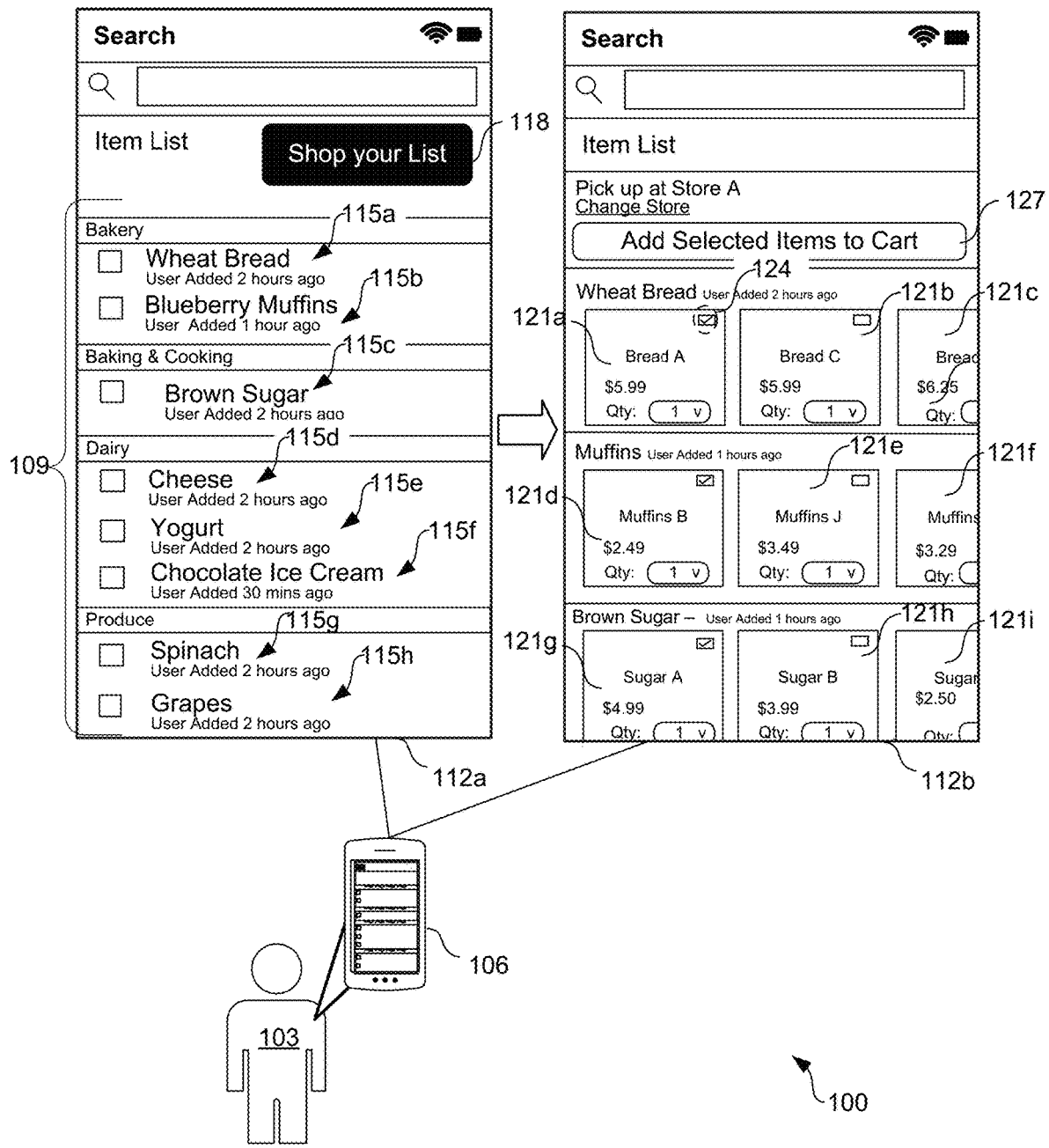
FIG. 1 is a drawing of an example scenario involving a shopping experience of an item list according to various embodiments of the present disclosure.

The present disclosure relates to providing an efficient and time-saving shopping experience by allowing a user to initiate a purchase of items corresponding to items included in an item list (e.g., shopping list) while minimizing required user interactions. According to various examples, a user may initiate a shopping experience via a voice command (e.g., "Shop my List") and/or interaction with a user interface associated with the item list. Using keywords included in the item list, a list of recommended items that correspond to items included in the shopping list and are available for purchase at a particular store can be determined and presented to the user. In various embodiments, at least a portion of the item recommendations are preselected for purchase based at least in part on a determined likelihood that the user will purchase the items. The user can review the recommended items and select a purchase component (e.g., add-to-cart component, buy component) displayed on the user interface, that upon selection, initiates the purchase of the selected items.

A shopping list or other list of items may be created by a user interacting with a list management service. According to various examples, users can interact with the list management service to create, manage and/or modify item lists (e.g., shopping lists, wish lists, etc.) that identify items one may wish to purchase from one or more merchants (e.g., an electronic commerce system, an online merchant store, a brick-and-mortar retail store, etc.). The shopping list can include item list entries that are defined by keywords defining the desired item. In various examples, the keywords can be user-defined. In other examples, the keywords can be selected from a predefined list of keywords that are associated with items that are available for purchase. In some examples, the keyword(s) for a given item list entry can be generic (e.g., noodles, sauce, milk, etc.). In other examples, the keyword(s) for a given item list entry can include one or more item attributes (e.g., brand, type, size, etc.) to further define a generic item (e.g., Brand A Chocolate Ice Cream).

According to various embodiments, a user may initiate a shopping experience through interactions with a user interface and/or a voice interface device associated with a list management service. In response to initiating a shopping experience, a search query may be generated using keywords in the item list. The search results of the search query may include one or more item recommendations for each of the item list entries of the item list based at least in part on the keywords, one or more shopping parameters (e.g., merchant, merchant location, type of delivery method, inventory, etc.), and/or other factors. In various examples, the item recommendations included in the search results may further be selected according to a determination of a likelihood of purchase by the user for the corresponding item recommendation that is based at least in part on a user interaction history (e.g., purchase history, viewing history, rating history, etc.).

As such, the user may be presented with the item recommendations for items that can be purchased from a given store and correspond to the items on the item list without requiring the user to search for individual items that are included in the item list. According to various embodiments, the item recommendations can each comprise a user interface component (e.g., a checkbox) that, when selected, indicates that the given item recommendation is selected for purchase. In various examples the user interface component for one or more of the item recommendations can be preselected, and the user can modify the selected item recommendations, as desired. With a selection of a purchase component (e.g., "add-to-cart" component, "buy now" component, etc.) included in the user interface that displays the item recommendations, the user can initiate the purchase of items corresponding to the selected item recommendations.

Turning now to FIG. 1, shown is an example of a shopping experience scenario 100 illustrating one example of how a user 103 interacting with a client device 106 can initiate a purchase of items corresponding to items defined in an item list 109. In various examples, the user 103 may have one or more user accounts with a list management service, and the user 103 can interact with a user interface 112*a* (or voice interface) associated with the list management service to create, manage and/or modify an item list 109 that identifies items that the user 103 may wish to purchase from one or more merchants (e.g., an electronic commerce system, an online merchant store, a brick-and-mortar retail store, etc.). According to various embodiments, the item list 109 can comprise item list entries 115 (e.g., 115a, 115b, 115c, 115d, 115e, 115f, 115g, 115h) with one or more keywords that define a particular item. For example, the keywords associated item list entry 115a correspond to "wheat bread."

According to various embodiments, when the user 103 is ready to purchase the items associated with a particular item list 109, the user 103 may initiate the shopping experience. In the example of FIG. 1, the shopping experience may be initiated by selecting the shopping component 118 that is included on the user interface 112a comprising the item list 109. In other examples, as will be described with reference to FIG. 3B, the user 103 may initiate the shopping experience for a given item list 109 by providing a voice command (e.g., "shop my list") to a voice interface of a client device 106.

According to various embodiments, upon initiation of the shopping experience, the keywords for one or more of the item list entries 115 can be translated into one or more item listings 121 (e.g., 121a, 121b, 121c, 121d, 121e, 121f, 121g, 121h, 121i) of items that are available for purchase via a particular merchant (e.g., an electronic commerce system, an online merchant store, a brick-and-mortar retail store, etc.) and presented to the user 103 via a user interface 112b. In some examples, the user may be requested to further define one or more shopping parameters associated with the shopping experience. For example, the one or more shopping parameters may include a particular merchant or store that the user wishes to purchase the items from, a merchant or store location, a type of delivery method (e.g., pick-up, delivery, etc.), and/or other shopping parameters that are particular to a given shopping experience.

In some examples, a batch search query can be generated based at least in part on the keywords for each of the item list entries 115, the shopping parameters, a user account, and/or other factors. The batch search query can be used by a search engine to identify item listings 121 of items that are available for purchase via the store defined by the one or more shopping parameters. According to various examples, the item listings 121 that are included in the user interface 112 may correspond to search results of the search query. In various examples, the items listings 121 can be arranged in the user interface 112 in an arrangement that is similar to the arrangement of the corresponding item list entries 115 of the item list 109, as shown in FIG. 1.

According to various embodiments, the item listings 121 that are presented to the user 103 via the user interface 112 may be selected and recommended to the user 103 based at least in part on a determination of a likelihood the user will purchase the item. In some examples, if multiple item listings 121 are identified for a given item list entry 115, a subset of the item listings 121 may be selected for the item list entry 115 to provide options to the user for selection. The subset of item listings 121 for a given item list entry 115 may be presented to the user 103 within the user interface 112b with respect to the given item list entry 115. The subset of item listings 121 may be presented in the user interface 112 in the form of an aisle. An aisle comprises a dynamically generated grouping of items that are associated with a particular item list entry 115.

In some examples, the subset of item listings 121 may be presented in an arrangement that is based at least in part on a determination of a likelihood that the user 103 will purchase the item. For example, for the item list entry 115a associated with "wheat bread," there may be ten (10) different item listings 121 for items available for purchase at the selected store that relate to "wheat bread." Each of the item listings 121 may be assigned a score that represents a determined likelihood that the user will purchase the item. The score may be based at least in part on multiple factors including, for example, a user interaction history (e.g., purchase history, viewing history, rating history, etc.), an item inventory at the given store, a popularity of the item (e.g., regional popularity, overall popularity, etc.), an aggregate user interaction history, a regional aggregate user interaction history, and/or other factors. Each of the item listings 121 may be ranked according to the score and a top-ranked subset of the item listings 121 (e.g., three item listings 121a, 121b, and 121c) can be selected to present to the user 103 via the user interface 112b. For example, if a user has previously purchased a particular item associated with a given item listing 121 that relates to a keyword of an item list entry, the given item listing 121 will be determined to have a greater likelihood that the user will purchase the item than an item of an item listing 121 that has not been previously purchased by the user.

According to various embodiments, each item listing 121 that is presented to the user 103 via the user interface 112 may comprise a checkbox component 124 that can be selected or unselected via user interaction with the user interface 112. In various examples, selection of the checkbox component 124 indicates that the corresponding item is selected for purchase. Deselection of the checkbox component 124 may indicate that the user does not wish to purchase the particular recommended item associated with the recommended item listing 121. In various examples, the user interface 112 may be generated such that the checkbox component 124 for the top-ranked item listing 121 for each item list entry 115 is preselected.

Since the top-ranked item listings 121 may be considered to have the greatest likelihood that the user will purchase, preselection of the checkbox component 124 for the top-ranked item listing 121 can save the user time by minimizing steps required by the user 103 prior to adding the items to the shopping cart and/or finalizing the purchase of the selected items. However, since additional options are provided to the user, when applicable, the user can modify the selected item listings 121, as desired, by selecting and/or deselecting the presented item listings 121. In addition to selecting and/or deselecting the desired item listings 121, the user may further modify the quantity or weight of the item for purchase. For example, in some examples, the item listing 121 may indicate a default quantity or weight (e.g., "1" or "4 oz"), but may include a user interface component that allows for the user to modify the quantity of the given item. In some examples, the default quantity and/or default weight may vary among items based at least in part on a user interaction history, aggregate user interaction history, popularity of the item, and/or other factors.

According to various embodiments, the user interface 112 that is generated to include the recommended item listings 121 may comprise a purchase component 127 (e.g., add-to-cart component, buy component) that is configured to, upon selection, add the selected item listings to a shopping cart and/or initiate or otherwise facilitate the purchase of items corresponding to the selected item listings 121. In various examples, when item listings 121 corresponding to a given item list entry 115 are purchased by the user, the item list 109 associated with the list management service may be modified to reflect a status associated with the purchased items from the item list. For example, the item list 109 may be modified to remove the purchased items from the item list 109. Therefore, the user 103 does not need to separately update and/or modify the item list 109 to remove the corresponding items form the item list 109.

In some examples, the selected store associated with a given shopping experience may not have item listings 121 that correspond to one or more items identified by the item list 109. For example, an item list entry 115 of an item list 109 may identify an item that is not available for purchase via the selected store. In some examples, a notification may be generated and presented to the user indicating that one or more items in the item list entry 115 are not available at the selected store.

In some examples, the user interface 112 that is generated and provided to the user 103 to include the item listings 121 corresponding to the item list 109 may further include additional item listings 121 that may be recommended to the user. These additional item listings 121 may be selected and recommended to the user based at least in part on a user interaction history, an aggregate interaction history, popularity of items, an identification of complementary items to items included in the item list 109, and/or other factors.

In some examples, the user interface 112 that is generated and provided to the user 103 to include the item listings 121 may provide a selectable link that allows the user to switch the store or merchant associated with the particular shopping experience. In response to selection of the selectable link by a user 103, the user interface 112 can be regenerated to include item listings 121 that are available at a different store and/or merchant that is selected by the user.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to individually search an online catalog for items of interest; (2) improving the functioning of the computing system through a more streamlined purchasing process that reduces user frustration when searching for other items; (3) improving the user experience in interacting with a computer system by providing a dynamically generated interface to allow a user to easily access recommended items for a shopping list; and so forth. In the following discussion, a general description of the system and its components is provided, followed by a discussion of the operation of the same.

Figure 2:
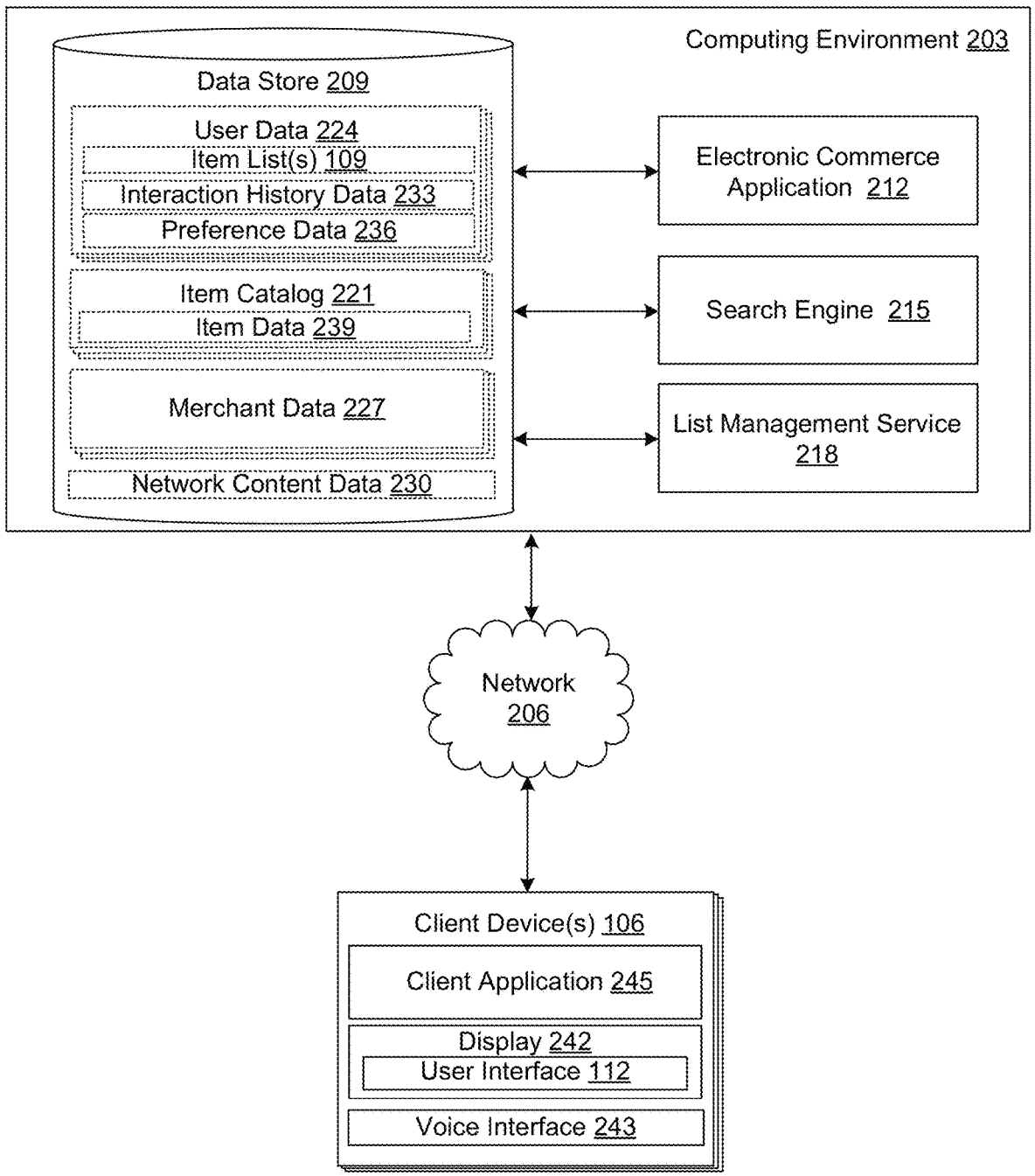
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client device 106, which are in data communication with each other via a network 206. The network 206 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 209 that is accessible to the computing environment 203. The data store 209 may be representative of a plurality of data stores 209 as can be appreciated. The data stored in the data store 209, for example, is associated with the operation of the various applications and/or functional entities described below.

The components executed on the computing environment 203, for example, include an electronic commerce application 212, a search engine 215, a list management service 218, and other applications, services, processes, systems, engines, or functionality not discussed in detail herein. The electronic commerce application 212 is executed to facilitate the online sale, download, lease, rent, etc. of items from one or more electronic commerce systems over the network 206. Such items may include products, goods, services, digital content, and/or other items. The electronic commerce application 212 also performs various backend functions associated with the online presence of an electronic commerce system in order to facilitate the online purchase of items. For example, the electronic commerce application 212 generates network pages such as, for example, web pages and/or other types of network content that are provided to client devices 106 for the purposes of promoting and selecting items for purchase, rental, download, lease, or any other forms of consumption.

The search engine 215 is executed to perform a search upon an item catalog 221 using a search query corresponding to the keywords of an item list 109 and return a set of search results (e.g., item listing 121). In various examples, the search query may comprise a batch search query corresponding to keywords corresponding to multiple item list entries 115 of an item list 109. The search results corresponding to each item list entry 115 may be ranked according to relevance, date, popularity, price, size, and/or other factors. The search engine 215 may also select the search results based at least in part on user profile characteristics (e.g., user purchase history, user query history, user browse history, user demographic data, user location, etc.), client device characteristics (e.g., client location, device type, browser type, etc.), shopping parameters (e.g., merchant/store, merchant/store location, type of delivery method (e.g., pick-up, delivery, etc.), and/or other data. Non-limiting examples of searches that may be performed via the search engine 215 may include product searches, service searches, image searches, music searches, video searches, a data search within a hosted computing resource, and/or other searches.

In addition, the search engine 215 is executed to source and select supplemental item listings 121 that can be presented in addition to the search results that are based at least in part on the keywords from the item list 109. In particular, the search engine 215 may select and retrieve supplemental item listings 121 from the item catalog 221 based at least in part on a user interaction history, an aggregate interaction history, popularity of items, an identification of complementary items to items included in the item list 109, and/or other factors.

The list management service 218 is executed to create, manage, and/or modify item lists 109 according to various embodiments of the present disclosure. According to various examples, users 103 can interact with the list management service 218 to create, manage and/or modify item lists 109 (e.g., shopping lists, wish lists, etc.) that identify items one may wish to purchase from one or more merchants (e.g., the electronic commerce system, an online merchant store, a brick-and-mortar retail store, etc.). In various examples, users 103 having user accounts with the electronic commerce application 212 may interact with the list management service 218 to select and purchase items that are available via the electronic commerce application 212. In other examples, the list management service 218 is independent from an electronic commerce application 212 and users may have user accounts with the list management service 218 that differ from a user account with the electronic commerce application 212.

The data stored in the data store 209 includes, for example, user data 224, an item catalog 221, merchant data 227, network content data 230, and potentially other data. The user data 224 includes various data collected from or generated by users and/or customers having accounts in an electronic commerce site facilitated by the electronic commerce application 212 and/or the list management service 218. The user data 224 may include item lists 109, interaction history data 233, preference data 236, account address (es), payment instrument data, authentication information, and/or other data associated with a user or user account of the electronic commerce application 212 and/or the list management service 218.

An item list 109 includes a list of keywords identifying items that one may wish to be purchased via the electronic commerce application 212, an online retail store, and/or a brick-and-mortar retail store. In some examples, an item list 109 may be specific to a given merchant (e.g., grocery store A). In other examples, an item list 109 may include items that are available for purchase, lease, download, etc., from multiple merchants. According to various examples, a user may view and interact with item lists 109 to help aid the user in selecting items during a shopping experience.

The interaction history data 233 may include information specific to a user account such as, for example, a purchase history (including purchase frequency, purchase cadence, purchase recency, etc.), a browsing history, a viewing history, a rating history, a search history, and/or other information that reflects a prior interaction by the user account with the computing environment 203. The preference data 236 may include information related to preferences of items, item refinements, brands of items, quality of items, quantity of items, and/or other information.

The item catalog 221 includes item data 239 regarding items offered through the electronic commerce application 212, an online retail store, and/or a brick-and-mortar retail store. Such items may include products, goods, services, digital content, and/or other items that can be offered for sale, lease, rent, download, etc. The items in the item catalog 221 may be organized according to a taxonomy of categories. For example, the items in the item catalog 221 may be categorized according to an item type with various item refinements further defining a placement of an item in the taxonomy. For example, milk and cheese can include two branches of the taxonomy under a category for "dairy." Further, the category associated with milk, for example, may further include branches according to type, flavoring, fat percentage, organic features, and so on.

The item data 239 may include item refinements, an item identifier, descriptions, weights, prices, quantities available, export restrictions, customer reviews, customer ratings, images, videos, version information, availability information, shipping information, and/or other data. Item refinements can include specific characteristics that define a given item. For example, item refinements can include size, color, weight, packaging, quantity, freshness, ripeness, nutritional values, how the item is processed, brand, seasonality (e.g., fall, winter, spring, summer, holidays, etc.), associated activities (e.g., celebration, weddings, picnics, sporting events, etc.), hazardous classification, fragility, import/export restrictions, and/or other refinements as can be appreciated. According to various examples, the keywords associated with the item list entries 115 can be compared to the item data 239 when determining item listings 121 to recommend to a user 103.

The merchant data 227 includes various data relating to merchants who have offered items for ordering through the electronic commerce application 212, an online retail store, and/or a brick-and-mortar retail store. The merchant data 227 may include, for example, data relating to store locations, store hours of operation, store delivery options (e.g., pick up, delivery), purchase orders, inventory data, order data, customer data, and/or other data.

The network content data 230 may include various data employed by the electronic commerce application 212, the list management service 218, and/or applications in generating user interfaces 112 and/or other network pages. The network content data 230 may include hypertext markup language (HTML), extensible markup language (XML), cascading style sheets (CSS), images, text, audio, video, templates, and/or other data.

The client device 106 is representative of a plurality of client devices that may be coupled to the network 206. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display 242. The display 242 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In various examples, the client device 106 may comprise a voice interface 243 that is used to facilitate interaction with the client device 106 via spoken commands. The voice interface 243 can be used to control a voice interface device that may integrated within the client device 106, as can be appreciated.

The client device 106 may be configured to execute various applications such as a client application 245 and/or other applications. The client application 245 may be executed in a client device 106, for example, to access network content served up by the computing environment 203 and/or other servers, thereby rendering a user interface 112 on the display 242. To this end, the client application 245 may comprise, for example, a browser, a dedicated application, etc., and the user interface 112 may comprise a network page, an application screen, etc. The client device 106 may be configured to execute applications beyond the client application 245 such as, for example, email applications, social networking applications, word processors, spreadsheets, and/or other applications.

Figure 3A:
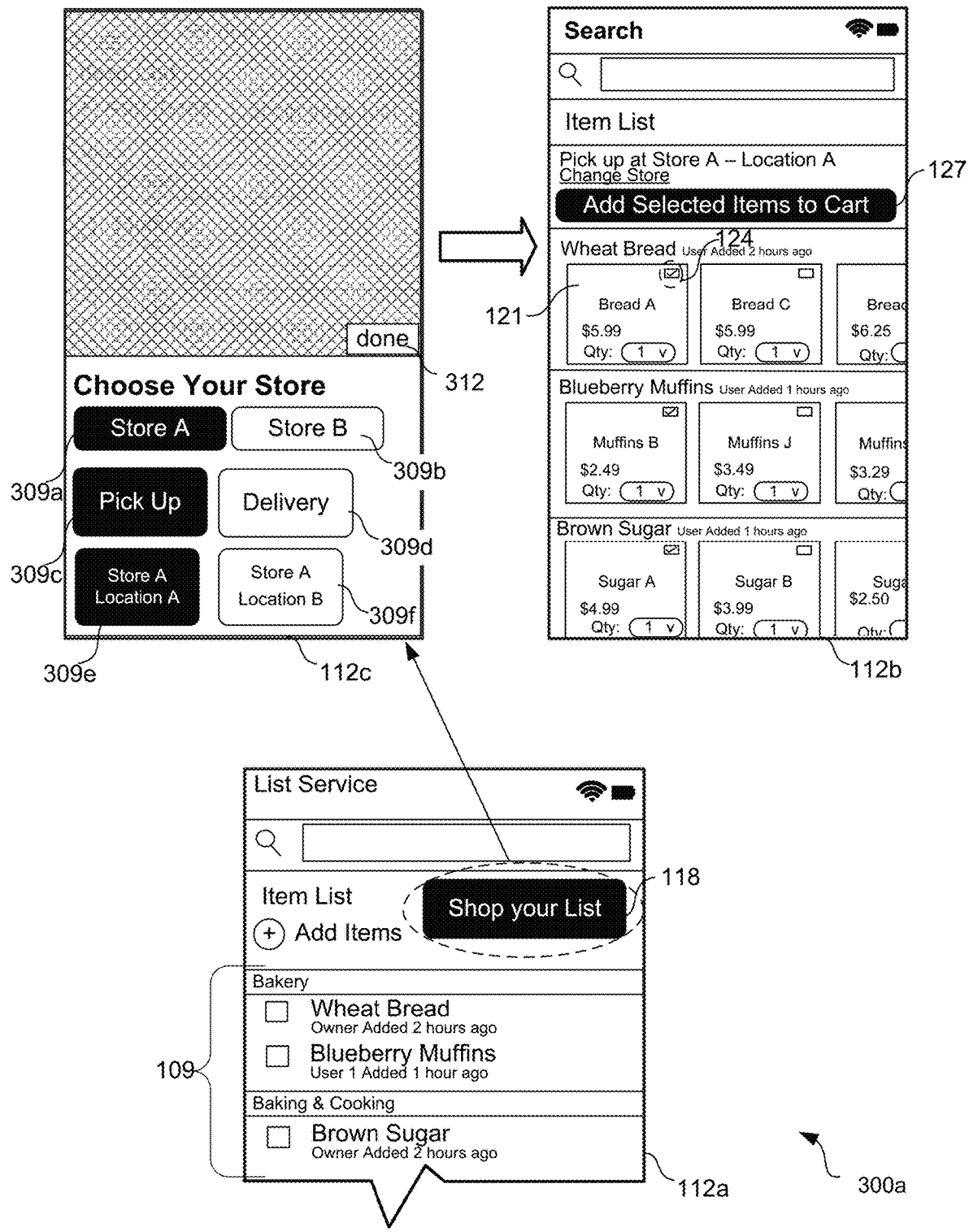
FIGS. 3A and 3B illustrate example scenarios showing different ways a user can initiate a shopping experience of a shopping list according to various embodiments of the present disclosure.

Next, a general description of the operation of the various components of the networked environment 200 is provided with reference to FIGS. 3A-8. To begin, FIGS. 3A-3B illustrate example scenarios associated with the establishment of a shopping experience in accordance to various embodiments of the present disclosure. In particular, FIG. 3A illustrates an example scenario 300a where a user 103 can initiate a shopping experience through interactions with a user interface 112a. FIG. 3B illustrates an example scenario 300b where a user 103 may initiate the shopping experience associated with a given item list 109 through interactions with a voice interface device 303 via a voice command 306, in accordance to various embodiments of the present disclosure.

Starting with FIG. 3A, shown is an example scenario 300a of a user 103 establishing a shopping experience based at least in part on interactions with one or more user interfaces 112 in accordance to various embodiments. In particular, FIG. 3A illustrates a portion of an example user interface 112a that includes a view of an item list 109 associated with the user account of the user 103. The user interface 112a includes a shopping component 118 that is configured to, upon selection, initiate a shopping experience associated with the given shopping list.

In various examples, upon establishing the shopping experience by selecting the shopping component 118, a user interface 112c or interface element (e.g., pop-up box, card component, etc.) can be generated and rendered on the client device 106 in order to obtain one or more shopping parameters associated with the shopping experience. The one or more shopping parameters may include for example, a zip code identification, a merchant identification (e.g., 309a, 309b), a merchant location (e.g., 309e, 309f), a type of delivery method (e.g., 309c, 309d), a brand identification, a chain store identification, and/or other factors that can be used to further define a given shopping experience.

As shown in FIG. 3A, the user interface 112c includes multiple user interface components 309 (e.g., 309a, 309b, 309c, 309d, 309e, 309f) that a user 103 can interact with to select various shopping parameters associated with the shopping experience. Although the user interface components 309 are shown as buttons, it is understood that these components 309 may include, a text input field, a text area, a drop-down box, a check-box, and/or any other components. When the user has selected the one or more parameters associated with the shopping experience, the user can proceed with the shopping experience by selecting the exit component 312.

In various examples, the user interface 112c may be dynamically updated to include additional components 309 that further refine previously selected shopping parameters. For example, the user interface components 309e and 309f that correspond to a merchant location may be added to the user interface 112c following selection of the store via selection of user interface component 309a. In another example, a user may interact with a user interface component to enter a zip code or other type of location identifier. In this example, the zip code may be used to search for stores associated with the zip code and dynamically generate one or more user interface components 309 corresponding to the identified stores for user selection.

Once the shopping parameters are obtained, the shopping experience proceeds by generating and rendering a user interface 112b that includes item listings 121 that include recommended items that are available for purchase at the given store associated with the shopping experience and correspond to items from the item list 109. As discussed, the item list entries 115 from the item list 109 are translated into item listings 121 for items that are available for purchase at the particular store that is defined in the one or more shopping parameters. For example, the list management service 218 may generate a batch search query comprising the keywords associated with the item list entries 115 of the item list 109 and may send the search query to the search engine 215. The search engine 215 may identify the items included in the item catalog 221 based at least in part on a comparison of the item data 239 and the search query. The search results may comprise the item listings 121 that are to be recommended to the user 103 according to the keywords from the item list 109, the one or more shopping parameters, the user data 224 (e.g., interaction history data 233, preference data 236, etc.), and/or other factors.

In particular, the item listings 121 that are presented to the user may be selected by the search engine 215 based at least in part on a likelihood that the user 103 will want to purchase the presented items. In various examples, multiple item listings 121 that correspond to a given item list entry 115 may be included in the user interface 112b that is presented to the user 103 to provide the user 103 with options for choosing items for purchase that are associated with his or her item list 109. In addition, the subset of item listings 121 corresponding to a given item list entry 115 may be arranged according to a ranked order such that the first item listing 121 presented for a given item list entry 115 may have a higher likelihood of purchase by the user 103 than the remaining item listings 121.

In some examples, one or more of the displayed item listings 121 may comprises a badge 307 (e.g., 307a, 307b, 307c) that provides a visual indication of a corresponding feature associated with the selection and/or ranking of the particular item listing 121. For example, a badge 307 may indicate that a particular item is previously purchased, on sale, popular in a given region, top-ranked product based on user reviews, recently added, and/or other features associated with a given item.

According to various examples, the checkbox component 124 for the top-ranked item listing 121 for each item list entry 115 may be preselected upon rendering of the user interface 112b. The user 103 may modify the selections of the checkbox component 124 as desired by selecting or deselecting the checkbox component 124. The user interface 112b may be generated to include a purchase component 127 that is configured to, upon selection, initiate the purchase of the selected item listings 121. In some examples, selection of the purchase component 127 causes the items associated with the selected item listings 121 to be added to a shopping cart. In other examples, selection of the purchase component 127 initiates an order of the items associated with the selected item listings 121.

Figure 3B:
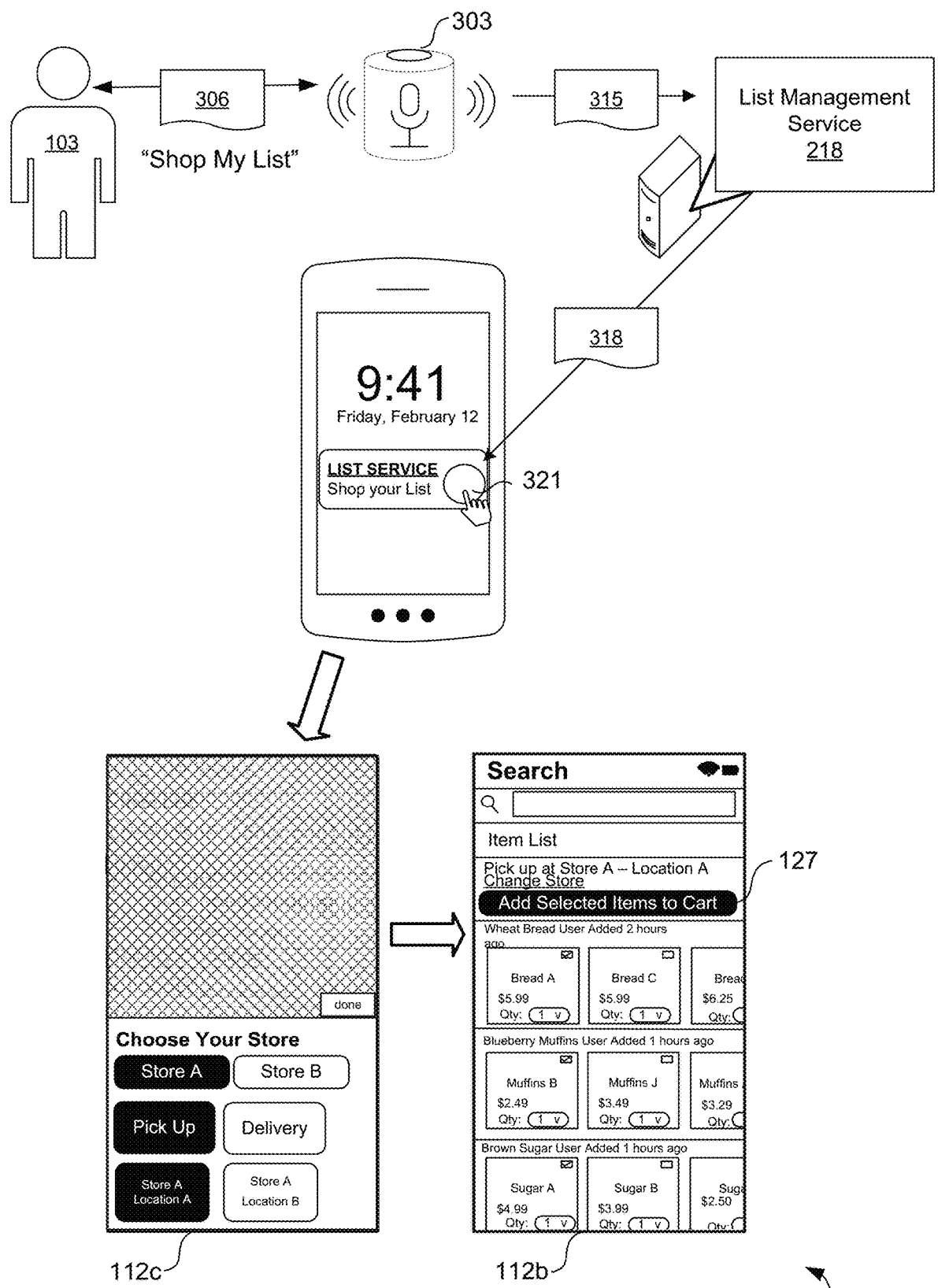

Turning now to FIG. 3B, shown is an example scenario 300b of a user 103 establishing a shopping experience by reciting a voice command 306 that is received by a voice interface device 303 in accordance to various embodiments. In this example, a particular voice command 306 (e.g., "shop my list") may trigger an initiation of a shopping experience. For example, a user 103 may recite a predefined voice command 306 that, when received by the voice interface device 303, triggers the transmission of a shopping experience request 315 to the list management service 218 or electronic commerce application 212 in the computing environment 203.

Upon receiving the shopping experience request 315 from the voice interface device 303, the list management service 218 or the electronic commerce application 212 may generate a notification 318 that can be sent to the client device 106 associated with the user 103 to provide the user 103 with access to the shopping experience. For example, the list management service 218 or the electronic commerce application 212 may send a push notification, a SMS message, an email message, and/or other type of notification to the client device 106.

In various examples, the notification may include a link 321 or other type of selectable component, that upon selection, redirects the user to one or more user interfaces 112 associated with the shopping experience. For example, the user 103 may be redirected to the user interface 112c that can be used to obtain the shopping parameters associated with the given shopping experience. However, it should be noted that in some examples, the shopping parameters may be obtained from the user 103 via one or more interactions with the voice interface device 303. For example, the user 103 may define the one or more shopping parameters via voice commands 306 that are received and processed by the voice interface device 303.

In other examples, the user 103 may be redirected to the user interface 112b that presents the recommended item listings 121 that are associated with the item list entries 115 in the given item list 109 and are available for purchase from a merchant or store associated with the given shopping experience. Accordingly, the user 103 can interact with the user interface 112b to review and/or modify the selected item listings 121 as well as initiate the purchase of the items associated with the selected item listings 121 by selecting the purchase component 127.

Figure 4:
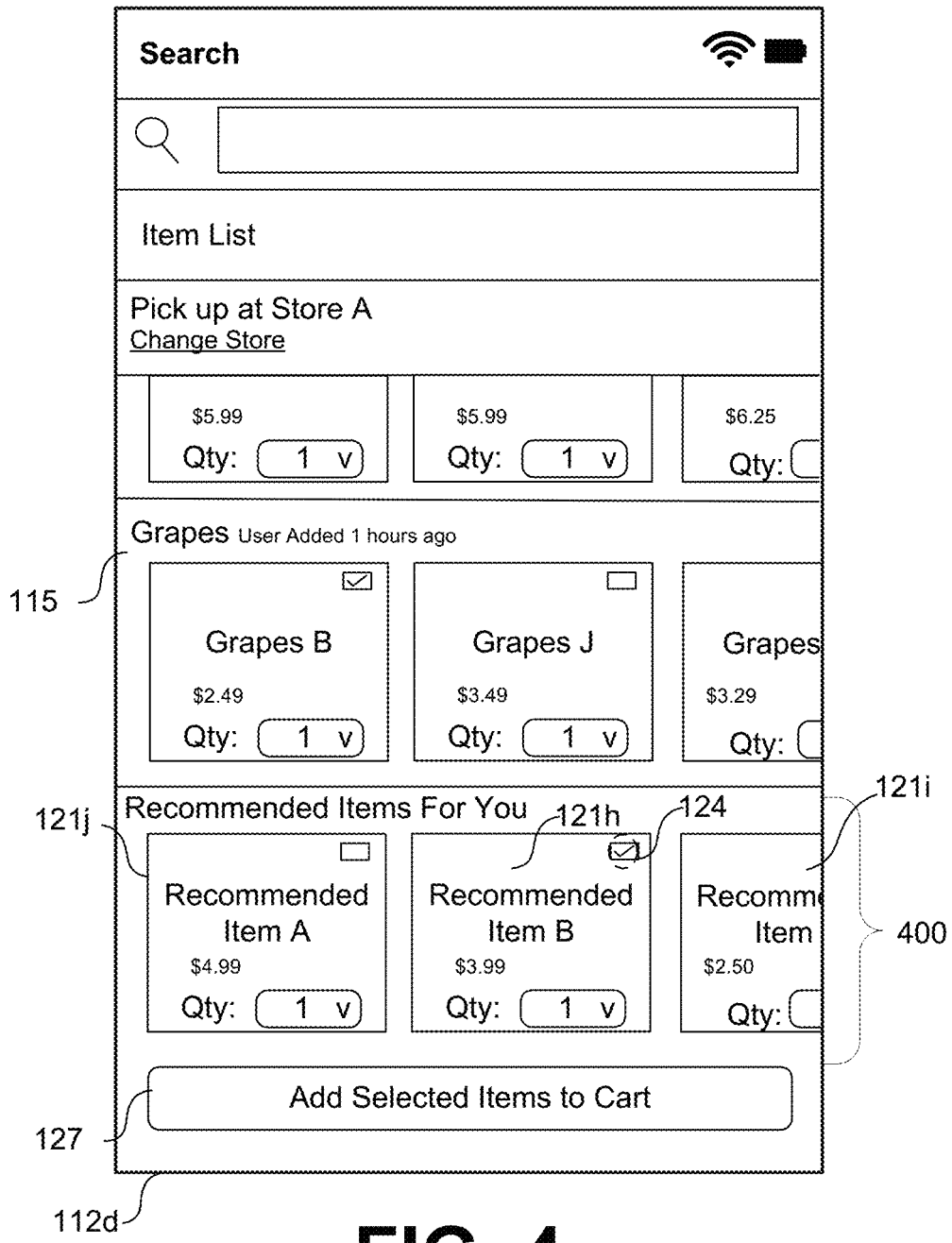
FIG. 4 is a pictorial diagram of an example user interface rendered by a client device in the networked environment of FIG. 2 according to various embodiments of the present disclosure.

Moving on to FIG. 4, shown is an example user interface 112d that illustrates a user interface element 400 that includes a plurality of item listings 121 (e.g., 121j, 121k, 121l) that are separate from the item listings 121 that correspond to the items defined by the item list 109. According to various embodiments, the recommended item listings 121 that are not part of the items defined by the item list 109 also include a checkbox component 124, thereby allowing the user 103 to select or deselect any checkbox component 124 for items associated with the recommended item listings 121. In some examples, none of the checkbox components 124 for the recommended item listings 121 are preselected. In other examples, one or more of the checkbox components 124 for the recommended items listings are preselected.

These additional item listings 121 may be selected from the item catalog 221 and recommended to the user based at least in part on a user interaction history, an aggregate interaction history, popularity of items, an identification of complementary items to items included in the item list 109, and/or other factors. A complementary item is an item that is linked to a particular item according to product attributes, known recipes, and/or other factors. For example, if one of the items in the shopping list 109 corresponds to "cookies" the additional item listings 121 may contain an item listing 121 for "milk" as milk may be considered to complement "cookies."

In various examples, the additional item listings 121 may be compared to the item listings 121 that are selected based at least in part on the items defined by the item list 109 to identify whether there are any duplicate item listings 121 between the two types of item listings 121. For example, the additional items listings 121 may include an item listing 121 for "grapes" based at least in part on a frequency of purchase by the user 103 with respect to "grapes." However, the item list 109 may define "fruit" as an item included in the item list 109, and the item listing 121 selected for the item list entry 115 for "fruit" may include an item listing 121 for "Grapes."

As such, the item listing 121 for "grapes" may be removed from one of the sets of item listings 121 to present to the user.

According to various examples, the item listings 121 that reference recommended items to the items in the item list 109 can be positioned at any location within the user interface 112 as can be appreciated. For example, in some examples, the user interface 112 is generated such that the user interface element 400 comprising the recommended item listings 121 is positioned at the bottom of the item listings 121 associated with the item list 109, above the item listings 121 associate with the item list 109, between aisles corresponding to different item list entries 115 of the item list, and/or other location as can be appreciated. In the example of FIG. 4, the recommended item listings 121 are positioned at the end of the item listings 121 corresponding to the item list 109 and included in the user interface 112 as below-the-fold content. In this example, the item listings 121 for recommended items included in the below-the-fold content of the user interface 112 are displayed in response to a user 103 interacting with the user interface 112 and scrolling below-the-fold of the presently rendered user interface 112 to view the additional item listings 121 associated with the item list 109 and/or the recommended item listings 121.

In some examples, the below-the-fold content of the user interface 112 may be dynamically generated to include user interface elements corresponding to the item listings 121 of the item listing 121 and/or the recommended item listings 121 that are received by the client device 106 from the computer environment 203. For example, the search results associated with a batch search query may be delivered in incremental batches and may be transferred to the client device 103 as generated and/or received from the search engine 215. Therefore, the user interface 112 that includes the item listings 121 may be generated to include the item listings 121 corresponding to the received but incomplete search results of the search query, thereby allowing the user to review the item listings 121 that have been received without having to wait for the search to complete for all item listings 121. As such, any latency issues associated with generating, rendering, and viewing the user interface 112 can be reduced. As the additional search results are received, the user interface 112 can be dynamically updated to include the additional item listings 121 that are to be presented to the user.

In various examples, as a user 103 interacts with the user interface 112 and the user interface 112 is dynamically updated to display below-the-fold or above-the-fold content, the user interface 112 can be updated such that the purchase component 127 is always visible within the user interface 112. As shown in FIG. 4, the purchase component 127 is displayed at the bottom of the user interface 112 where in the examples of FIG. 1, FIG. 3A, and FIG. 3B, the purchase component 127 is displayed at the top of the user interface 112. By having the purchase component 127 always visible on the user interface 112, the user 103 can select the purchase component 127 to initiate the purchase of the selected items without additional interaction by the user with the user interface 112 (e.g., scrolling above-the-fold or below-the-fold to access the purchase component 127).

Figure 5:
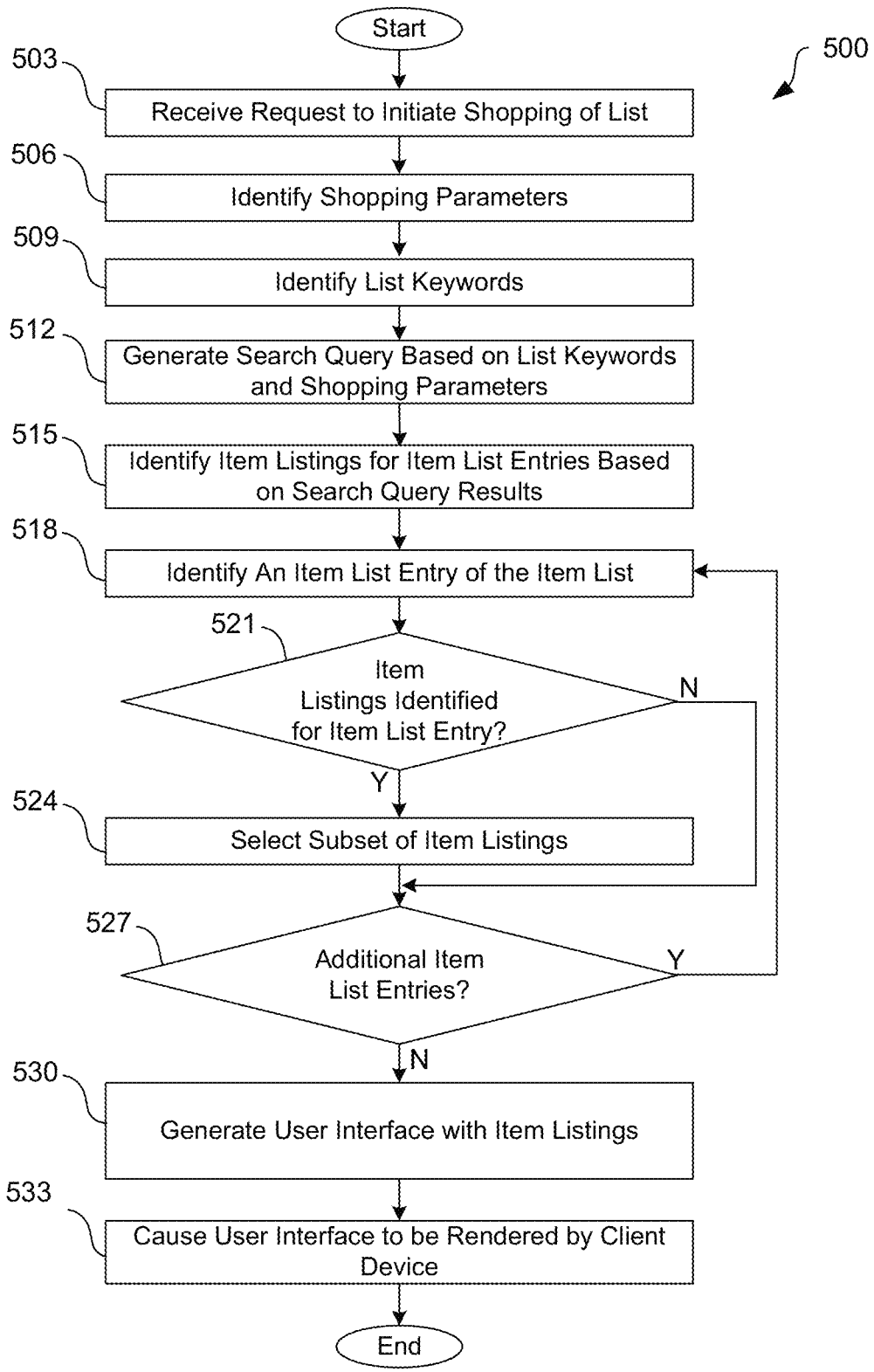
FIGS. 5-7 are flowcharts illustrating examples of functionality implemented as portions of a list management service executed in a computing environment in the networked environment of FIG. 2 according to various embodiments of the present disclosure.

Referring next to FIG. 5, shown is a flowchart 500 that provides one example of the operation of a portion of the list management service 218 and/or other applications according to various embodiments. It is understood that the flowchart 500 of FIG. 5 provides merely an example of the many different types of functional arrangements that may be employed to implement the operation of the portion of the list management service 218 and/or other applications as described herein. As an alternative, the flowchart 500 of FIG. 5 may be viewed as depicting an example of elements of a method implemented in the computing environment 203 (FIG. 2) according to one or more embodiments.

Beginning with box 503, the list management service 218 receives a shopping experience request 315 to initiate a shopping experience associated with an item list 109. As discussed with regard to FIGS. 3A and 3B, a user 103 may initiate a shopping experience through interactions with a user interface and/or a voice interface device 303 associated with the list management service 218. For example, a user interacting with a user interface 112 that includes a view of the item list 109 may select a shopping component 118 that is configured to, upon selection, initiate a shopping experience associated with the given item list 109. In this example, selection of the shopping component 118 may generate a shopping experience request 315 that is then sent to the list management service 218 or electronic commerce application 212 in the computing environment 203, thereby initiating the shopping experience.

In another example, a user 103 may recite a voice command 306 that is received by a voice interface device 303 in accordance to various embodiments. In this example, a particular voice command 306 (e.g., "shop my list") may trigger an initiation of a shopping experience. For example, a user 103 may recite a predefined voice command 306 that, when received by the voice interface device 303, triggers the generation and transmission of a shopping experience request 315 to the list management service 218 or electronic commerce application 212 in the computing environment 203.

At box 506, the list management service 218 identifies one or more shopping parameters associated with the shopping experience. The one or more shopping parameters can be used to define various characteristics associated with the shopping experience including, a merchant identification, a merchant location a type of delivery method, and/or other factors that can be used to further define a given shopping experience. In various examples, the user 103 may be redirected to a user interface 112 that includes one or more user interface components 309 that a user 103 can interact with to define the one or more shopping parameters.

At box 509, the list management service 218 identifies keywords associated with the item list 109. In particular, item list 109 can include item list entries 115 that are defined by keywords defining the desired item. In various examples, the keywords can be user-defined. In other examples, the keywords can be selected from a predefined list of keywords that are associated with items that are available for purchase. Each item list entry 115 may be defined by one or more keywords defining the item that the user 103 may wish to purchase from a given merchant.

At box 512, the list management service 218 generates a search query based at least in part on the keywords and the shopping parameters. In some examples, the search query comprise a batch search query that includes separate search queries for each of the item list entries 115 in the item list 109 based at least in part on the keywords for each of the item list entries 115. The search query can further include the shopping parameters that can be used by the search engine 215 when identifying and selecting the search query results. Upon generating the search query, the list management service 218 can transmit the search query to the search engine 215 in a request for search results including item listings 121 for items available for purchase by the merchant defined in the shopping parameters. The search engine 215 is executed to perform a search upon an item catalog 221 using a search query corresponding to the keywords of an item list 109 and return a set of search results (e.g., item listings 121).

At box 515, the list management service 218 receives the search results from the search engine 215 and identifies the item listings 121 for the item list entries 115 based at least in part on the search results. In particular, the search results comprise item listings 121 for items that are available for purchase from the store identified in the shopping parameters and are determined to be of interest to the user based on a determined likelihood of purchase by the user. In some examples, the search results may include multiple item listings 121 corresponding to an item of a given item list entry 115. In particular, the multiple item listings 121 may be ranked according to a likelihood of purchase by the user 103.

In various embodiments, the search results corresponding to each item list entry 115 may be ranked according to relevance, date, popularity, price, size, and/or other factors. The search engine 215 may also select the search results based at least in part on user profile characteristics (e.g., user purchase history, user query history, user browse history, user demographic data, user location, etc.), client device characteristics (e.g., client location, device type, browser type, etc.), shopping parameters (e.g., merchant/store, merchant/store location, type of delivery method (e.g., pick-up, delivery, etc.), and/or other data.

At box 518, the list management service 218 identifies an item list entry 115 of the item list 109. For example, an item list 109 may contain multiple item list entries 115 corresponding to multiple items included in the item list 109. The item list entry 115 that is identified may correspond to the first item list entry 115 in the item list 109, a sequential item list entry 115 from a previously identified item list entry 115, a randomly identified item list entry 115, and/or other item list entry 115 as can be appreciated.

At box 521, the list management service 218 determines whether there are any item listings 121 included in the search results for the identified item list entry 115. In some examples, the store associated with the shopping experience and defined by the shopping parameters may not offer for sale any items corresponding to the item defined by the item list entry 115. As such, the search results may not return any item listings 121 for the given item list entry 115. In some examples, the list management service 218 may generate a notification indicating that the particular store does not offer a corresponding item for sale and that the item will not be fulfilled during the shopping experience. The notification can be sent to the client device 106 to notify the user 103. If there are no item listings 121 for the given item list entry 115, the list management service 218 proceeds to box 527. Otherwise, the list management service 218 proceeds to box 524.

At box 524, the list management service 218 may select a subset of the item listings 121 to include in the user interface 112. For example, the search results may include a quantity of item listings 121 that exceed a predefined threshold of item listings 121 to include or otherwise display for any given item list entry 115. Therefore, the list management service 218 may select a subset of the top-ranked item listings 121 according to a predefined threshold (e.g., 3, 5, 10, etc.). The item listings 121 can be ranked by the search engine 215 and/or the list management service 218 according to a score that is based at least in part on a likelihood that the user 103 will purchase the item. Therefore, the item listings 121 that are considered to be most relevant to the user based at least in part on the determined likelihood that the user 103 will purchase are included in the user interface 112.

At box 527, the list management service 218 determines if there are additional item list entries 115. If there are additional item list entries 115, the list management service 218 returns to box 518. Otherwise, the list management service 218 proceeds to box 530.

At box 530, the list management service 218 identifies recommended item listings 121 that are identified separately from the item listings 121 that are identified via the search query generated in box 512. According to various examples, the search engine 215 may source and select recommended item listings 121 that can be presented in addition to the search results that are based at least in part on the keywords from the item list 109. In particular, the search engine 215 may select and retrieve recommended item listings 121 from the item catalog 221 based at least in part on a user interaction history, an aggregate interaction history, popularity of items, an identification of complementary items to items included in the item list 109, and/or other factors In some examples, the list management service 218 may identify the recommended item listings 121 in a request that is separate from the search query. In other examples, the request for recommended items may be included with the search query.

At box 533, the list management service 218 generates a user interface 112 that includes the item listings 121. In various examples, the list management service 218 may generate the user interface 112 by generating user interface code that is provided to the client application 245 for generating the user interface 112 that includes the item listings 121. In other examples, the user interface 112 is generated and sent to the client device 106 for rendering.

In various examples, the user interface 112 or user interface code can be generated and defined to include user interface elements that correspond to the various item listings 121. Each user interface element can comprise a checkbox component 124. Selection of the checkbox component 124 indicates that the corresponding item is selected for purchase. Deselection of the checkbox component 124 may indicate that the user does not wish to purchase the particular recommended item associated with the recommended item listing 121. In various examples, the user interface 112 can be generated such that the checkbox component 124 for the top-ranked item listing 121 for each item list entry 115 is preselected. The user 103 may modify the selections of the checkbox component 124 as desired by selecting or deselecting the checkbox component 124.

In addition, the arrangement of the item listings 121 can be defined in the user interface code and/or generating of the user interface. In various examples, the item listings 121 are arranged according to the arrangement of item list entries 115 in the item list 109. In other examples, the item listings 121 may be arranged according to product category, interest to the user, and/or other type of arrangement as can be appreciated.

In various examples, the user interface 112 is generated or otherwise defined in the user interface code to include a purchase component 127 that is configured to, upon selection, initiate the purchase of the selected item listings 121. In some examples, selection of the purchase component 127 causes the items associated with the selected item listings 121 to be added to a shopping cart. In other examples, selection of the purchase component 127 initiates an order of the items associated with the selected item listings 121.

At box 536, the list management service 218 causes the user interface 112 to be rendered on the client device 106. As discussed above, the list management service 218 may transmit user interface code that can be executed by the client application 245 to generate and render the user interface 112 on the client device 106. In other examples, the list management service 218 can transmit the generated user interface 112 to the client device 106 for rendering. For example, the list management service 218 can send data associated with the generated user interface 112 in response to an application programming interface (API) call from the client application 245. Thereafter, this portion of the process proceeds to completion.

It should be noted that in various examples, the search results associated with the search query may be received by the list management service 218 in incremental batches and may be transferred to the client device 103 as generated and/or received from the search engine 215. Therefore, the user interface 112 that includes the item listings 121 may be generated to include the item listings 121 corresponding to the received but incomplete search results of the search query, thereby allowing the user to review the item listings 121 that have been received without having to wait for the search to complete for all item listings 121. As such, any latency issues associated with generating, rendering, and viewing the user interface 112 can be reduced. As the additional search results are received, the user interface 112 can be dynamically updated to include the additional item listings 121 that are to be presented to the user 103.

Figure 6:
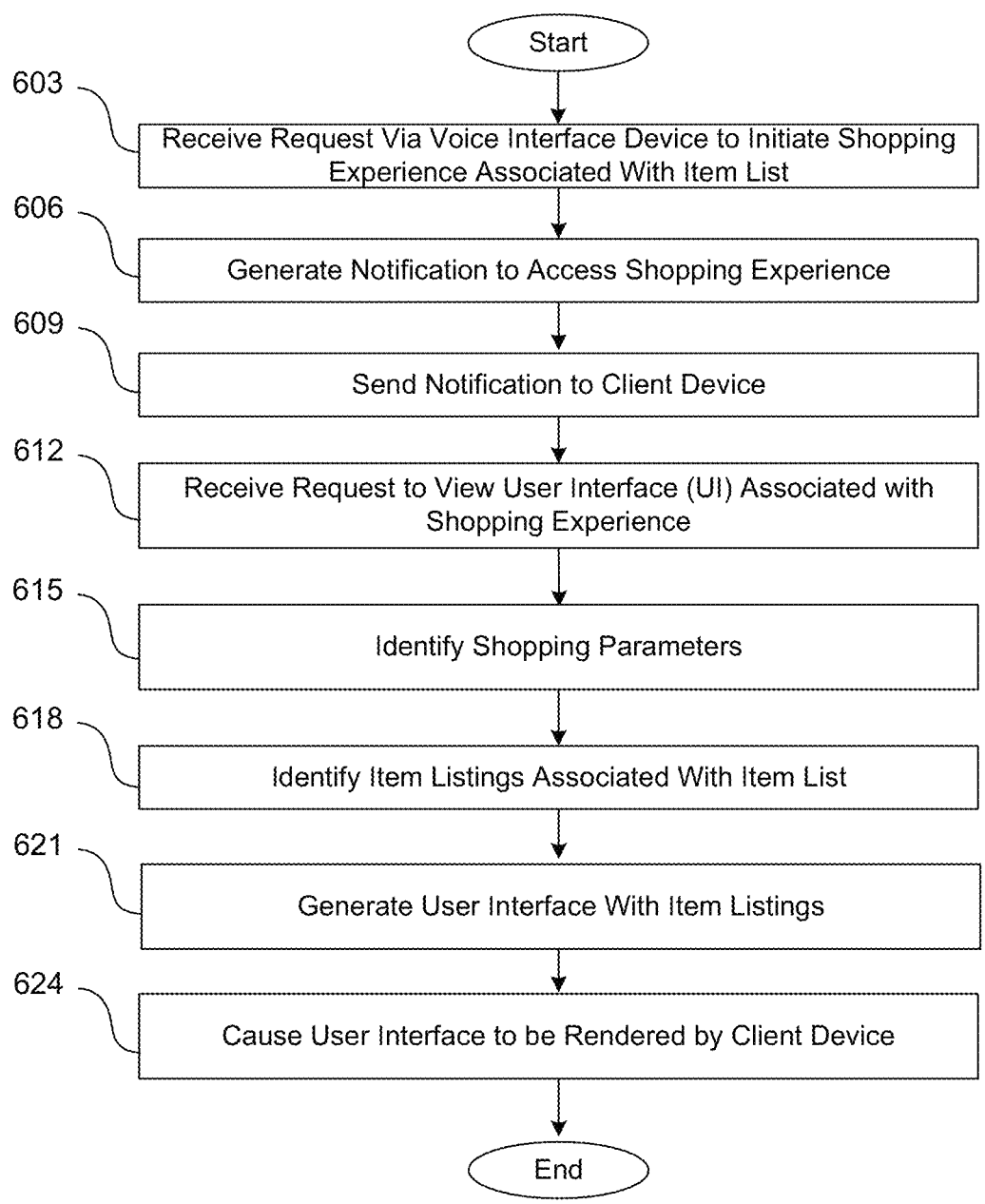

Referring next to FIG. 6, shown is a flowchart 600 that provides one example of the operation of a portion of the list management service 218 and/or other applications according to various embodiments. It is understood that the flowchart 600 of FIG. 6 provides merely an example of the many different types of functional arrangements that may be employed to implement the operation of the portion of the list management service 218 and/or other applications as described herein. As an alternative, the flowchart 600 of FIG. 6 may be viewed as depicting an example of elements of a method implemented in the computing environment 203 (FIG. 2) according to one or more embodiments.

Beginning with box 603, the list management service 218 receives a shopping experience request 315 to initiate a shopping experience associated with an item list 109. In particular, the shopping experience request 315 is received from a voice interface device 303 in response to a user 103 reciting a predefined voice command 306 (e.g., "shop my list") that, when received by the voice interface device 303, triggers the generation and transmission of the shopping experience request 315.

At box 606, the list management service 218 generate a notification 318 that can be sent to the client device 106 associated with the user 103 to provide the user 103 with access to the shopping experience. In various examples, the notification may include a link 321 or other type of selectable component, that upon selection, redirects the user to one or more user interfaces 112 associated with the shopping experience.

At box 609, the list management service 218 sends the notification 318 to the client device 106. For example, the list management service 218 may send a push notification, a SMS message, an email message, and/or other type of notification to the client device 106.

At box 612, the list management service 218 receives a requite to view user interfaces 112 associated with the shopping experience. As discussed at box 606, the notification may include a link 321 or other type of selectable component, that upon selection, redirects the user to one or more user interfaces 112 associated with the shopping experience. Therefore, the request to view a user interface 112 associated with the shopping experience can be in response to a selection of the link 321 or other selectable component included in the notification 318.

At box 615, the list management service 218 identifies the shopping parameters associated with the shopping experience. In some examples, the shopping parameters may be obtained from the user 103 via one or more interactions with the voice interface device 303. For example, the user 103 may define the one or more shopping parameters via voice commands 306 that are received and processed by the voice interface device 303.

In other examples, the shopping parameters can be obtained in response to user interactions with a user interface 112c. The user interface 112c includes one or more user interface components 309 that a user can interact with to select various shopping parameters associated with the shopping experience. When the user has selected the one or more parameters associated with the shopping experience via interactions with the one or more user interface components 309, the user can proceed with the shopping experience by selecting the exit component 312. In various examples, the user interface 112c may be dynamically updated to include additional components 309 that further refine previously selected shopping parameters. For example, the user interface components 309e and 309f that correspond to a merchant location may be added to the user interface 112c following selection of the store via selection of user interface component 309a.

At box 618, the list management service 218 can identify item listings 121 associated with the item list 109. In various examples, the item listings 121 can be included in search results to a search query that is generated using the keywords included in the item list 109. A search engine 215 may search an item catalog 221 using the search query corresponding to the keywords of an item list 109 and return a set of search results (e.g., item listings 121).

In particular, the search results may comprise item listings 121 for items that are available for purchase from the store identified in the shopping parameters and are determined to be of interest to the user based on a determined likelihood of being purchased by the user. In some examples, the search results may include multiple item listings 121 corresponding to an item of a given item list entry 115. In particular, the multiple item listings 121 may be ranked according to a likelihood of being purchased by the user 103.

At box 621, the list management service 218 generates a user interface 112 that includes the item listings 121. In various examples, the list management service 218 may generate the user interface 112 by generating user interface code that is provided to the client application 245 for generating the user interface 112 that includes the item listings 121. In other examples, the user interface 112 is generated and sent to the client device 106 for rendering.

In various examples, the user interface 112 or user interface code can be generated and defined to include user interface elements that correspond to the various item listings 121. Each user interface element can comprise a checkbox component 124. Selection of the checkbox component 124 indicates that the corresponding item is selected for purchase. Deselection of the checkbox component 124 may indicate that the user does not wish to purchase the particular recommended item associated with the recommended item listing 121. In various examples, the user interface 112 can be generated such that the checkbox component 124 for the top-ranked item listing 121 for each item list entry 115 is preselected. The user 103 may modify the selections of the checkbox component 124 as desired by selecting or deselecting the checkbox component 124.

In addition, the arrangement of the item listings 121 can be defined in the user interface code and/or generating of the user interface. In various examples, the item listings 121 are arranged according to the arrangement of item list entries 115 in the item list 109. In other examples, the item listings 121 may be arranged according to product category, interest to the user, and/or other type of arrangement as can be appreciated.

In various examples, the user interface 112 is generated or otherwise defined in the user interface code to include a purchase component 127 that is configured to, upon selection, initiate the purchase of the selected item listings 121. In some examples, selection of the purchase component 127 causes the items associated with the selected item listings 121 to be added to a shopping cart. In other examples, selection of the purchase component 127 initiates an order of the items associated with the selected item listings 121.

At box 624, the list management service 218 causes the user interface 112 to be rendered on the client device 106. As discussed above, the list management service 218 may transmit user interface code that can be executed by the client application 245 to generate and render the user interface 112 on the client device 106. In other examples, the list management service 218 can transmit the generated user interface 112 to the client device 106 for rendering. For example, the list management service 218 can send data associated with the generated user interface 112 in response to an application programming interface (API) call from the client application 245. Thereafter, this portion of the process proceeds to completion.

Figure 7:
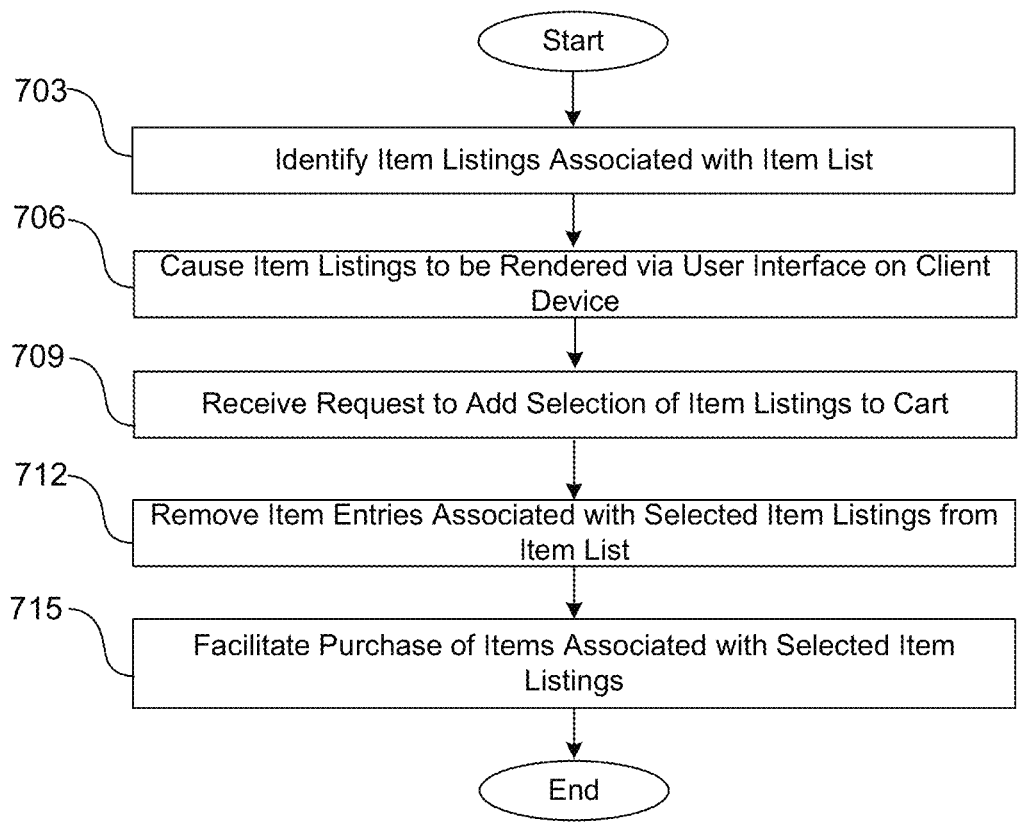

Referring next to FIG. 7, shown is a flowchart 700 that provides one example of the operation of a portion of the list management service 218 and/or other applications according to various embodiments. It is understood that the flowchart 700 of FIG. 7 provides merely an example of the many different types of functional arrangements that may be employed to implement the operation of the portion of the list management service 218 and/or other applications as described herein. As an alternative, the flowchart 700 of FIG. 7 may be viewed as depicting an example of elements of a method implemented in the computing environment 203 (FIG. 2) according to one or more embodiments.

Beginning with box 703, the list management service 218 can identify item listings 121 associated with a given item list 109. In various examples, the item listings 121 can be included in search results to a search query that is generated using the keywords included in the item list 109. A search engine 215 may search an item catalog 221 using the search query corresponding to the keywords of an item list 109 and return a set of search results (e.g., item listings 121).

In particular, the search results may comprise item listings 121 for items that are available for purchase from the store identified in the shopping parameters and are determined to be of interest to the user based on a determined likelihood of being purchased by the user. In some examples, the search results may include multiple item listings 121 corresponding to an item of a given item list entry 115. In particular, the multiple item listings 121 may be ranked according to a likelihood of being purchased by the user 103.

At box 706, the list management service 218 causes the user interface 112 to be rendered on the client device 106. The list management service 218 may transmit user interface code that can be executed by the client application 245 to generate and render the user interface 112 on the client device 106. In other examples, the list management service 218 can transmit the generated user interface 112 to the client device 106 for rendering. For example, the list management service 218 can send data associated with the generated user interface 112 in response to an application programming interface (API) call from the client application 245.

In various examples, the list management service 218 may generate the user interface code that is provided to the client application 245 for generating the user interface 112 that includes the item listings 121. In various examples, the user interface code can be generated and defined to include user interface elements that correspond to the various item listings 121. Each user interface element can comprise a checkbox component 124. Selection of the checkbox component 124 indicates that the corresponding item is selected for purchase. Deselection of the checkbox component 124 may indicate that the user does not wish to purchase the particular recommended item associated with the recommended item listing 121. In various examples, the user interface 112 can be generated such that the checkbox component 124 for the top-ranked item listing 121 for each item list entry 115 is preselected. The user 103 may modify the selections of the checkbox component 124 as desired by selecting or deselecting the checkbox component 124.

In addition, the arrangement of the item listings 121 can be defined in the user interface code. In various examples, the item listings 121 are arranged according to the arrangement of item list entries 115 in the item list 109. In other examples, the item listings 121 may be arranged according to product category, interest to the user, and/or other type of arrangement as can be appreciated.

In various examples, the user interface code defines the user interface 112 to include a purchase component 127 that is configured to, upon selection, initiate the purchase of the selected item listings 121. In some examples, selection of the purchase component 127 causes the items associated with the selected item listings 121 to be added to a shopping cart. In other examples, selection of the purchase component 127 initiates an order of the items associated with the selected item listings 121.

At box 709, the list management service 218 receives a request to add the selected item listings 121 to a shopping cart. For example, the request to add the selected item listings 121 can be received in response to a user selecting the purchase component 127 included in the user interface 112. In response to receiving the request to add the selected item listings 121 to the shopping cart, the list management service 218 can identify the item listings 121 that are to be considered selected based at least in part on identifying the item listings 121 having the checkbox component 124 selected.

At box 712, the item list entries 115 that correspond to the selected item listings 121 are identified and the item list 109 are modified to reflect the selection of the item listings 121 from the user interface 112. For example, if an item listing 121 is selected for each of the item list entries 115 in an item list 109, all of the item list entries 115 may be removed from the item list 109 and the item list 109 will be considered empty. However, if some of the item list entries 115 are left unfulfilled by either not having items available for purchase at the given store (e.g., no identified item listings 121) or the user failing to select any of the item listings 121 presented for a given item list entry 115, those corresponding item list entries 115 will remain in the item list 109 while all other fulfilled item list entries will be removed. In other examples, the item list entries 115 may be modified to reflect a current status associated with the particular items. For example, if an item has been selected for purchase, but has not yet been delivered and/or picked-up by the user 103, the corresponding item list entries 115 may be modified to indicate that the item has been selected for purchase.

At box 715, the list management service 218 or electronic commerce application 212 will facilitate purchase of the items associated with the selected item listings 121. For example, an order can be created with regard to the selected items, payment for the items can be processed, the items corresponding to the item listings 121 can be collected at the store, the items can be delivered to the user and/or picked up by the user, and/or other actions that are associated with the purchase of the items can be completed. Thereafter, this portion of the process proceeds to completion.

It should be noted that although the example of FIG. 7 illustrates that the item list entries 115 associated with the selected item listing 112 are modified from the item list 109 prior to facilitating the purchase of the items associated with the selected item listings 121, in various examples, the item list 109 may be updated after the items are added to the cart, purchased, delivered, or picked up.

Figure 8:
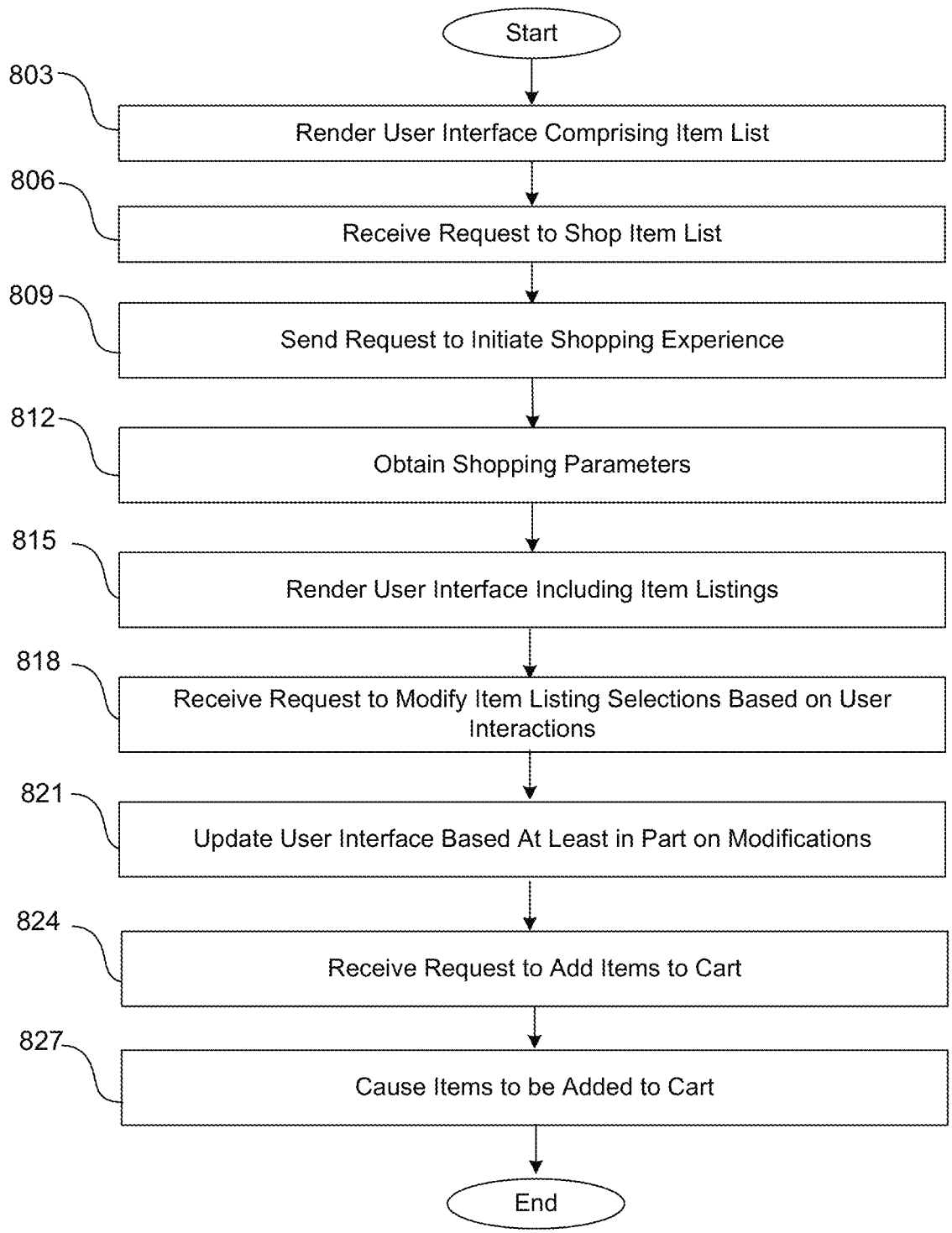
FIG. 8 is a flowchart illustrating an example of functionality implemented as portions of a client application executed in a client device in the networked environment of FIG. 2 according to various embodiments of the present disclosure.

Referring next to FIG. 8, shown is a flowchart 800 that provides one example of the operation of a portion of the client application 245 and/or other applications according to various embodiments. It is understood that the flowchart 800 of FIG. 8 provides merely an example of the many different types of functional arrangements that may be employed to implement the operation of the portion of the client application 245 and/or other applications as described herein. As an alternative, the flowchart 800 of FIG. 8 may be viewed as depicting an example of elements of a method implemented in the client device 106 (FIG. 2) according to one or more embodiments.

Beginning with box 803, the client application 245 renders a user interface 112 comprising an item list 109. In particular, a user 103 can create, manage, and/or modify an item list 109 associated with the list management service 218 via interactions with the user interface 112a comprising the item list 109. In various examples, the user interface 112 comprises a shopping component 118 that is configured to, upon selectin, initiate a shopping experience associated with the item list 109.

At box 806, the client application 245 receives a request to shop the item list 109. In particular, the client application 245 can monitor the interactions with the user interface 112 and can detect a selection of the shopping component 118. The selection of the shopping component 118 corresponds to the request to shop the item list 109.

At box 809, in response to receiving the request to shop the item list 109, the client application 245 can generate a shopping experience request 315 and send the request 315 to the list management service 218 to initiate a shopping experience associated with an item list 109.

At box 812, the client application 812 renders a user interface 112 and obtains the shopping parameters associated with the requested shopping experience via user interactions with the user interface 112. The user interface 112 includes one or more user interface components 309 that a user can interact with to select various shopping parameters associated with the shopping experience. In various examples, the user interface 112c may be dynamically updated to include additional components 309 that further refine previously selected shopping parameters. For example, the user interface components 309e and 309f that correspond to a merchant location may be added to the user interface 112c following selection of the store via selection of user interface component 309a. Upon identifying the shopping parameters, the client application 245 can transmit the obtained shopping parameters to the list management service 218.

At box 815, the client application 245 renders the user interface 112 including the item listings 121 that correspond to the items in the item list 109 and are available for purchase from the merchant defined in the shopping parameters. The client application 245 may receive user interface code that can be executed by the client application 245 to generate and render the user interface 112 on the client device 106. In other examples, the list management service 218 can transmit the generated user interface 112 to the client device 106 for rendering.

At box 818, the client application 245 receives a request to modify the item listing selections based at least in part on one or more user interactions. In particular, a user may select or deselect the checkbox component 124 for any of the rendered item listings 121. Selection of the checkbox component 124 indicates that the corresponding item is selected for purchase. Deselection of the checkbox component 124 may indicate that the user does not wish to purchase the particular recommended item associated with the recommended item listing 121.

At box 821, the client application 245 can update the user interface 112 based at least in part on the modifications. In particular, the user interface 112 can be dynamically updated to reflect which checkbox components 124 for the different item listings 121 are selected or deselected based at least in part on the user interactions.

At box 824, the client application 245 receives a request to add the selected item listings 121 to a shopping cart. For example, the request to add the selected item listings 121 can be received in response to a user selecting the purchase component 127 included in the rendered user interface 112.

At box 827, in response to receiving the request to add the selected item listings 121 to the shopping cart, the client application 245 can generate a notification and send the notification to the list management service 218 and/or the electronic commerce application 212 identifying the item listings 121 that are selected and requesting the selected items are added to the shopping cart. The user interface 112 can also be modified to indicate that the selected items are now included in the shopping cart. In some examples, the user may be redirected to a user interface view of the shopping cart. In this example, the client application 245 may generate a user interface 112 comprising a view of the shopping cart in response to adding the selected item listings 121 to the shopping cart. Thereafter, this portion of the process proceeds to completion.

Figure 9:
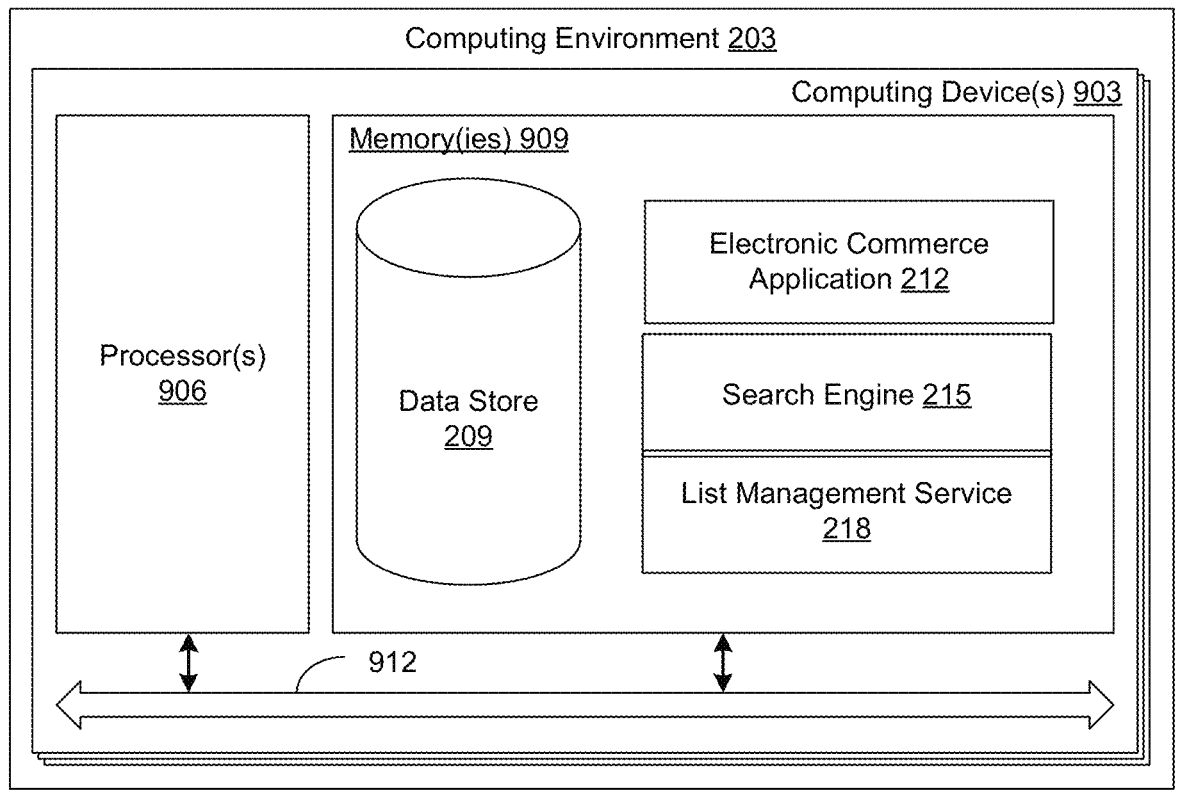
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices 903. Each computing device 903 includes at least one processor circuit, for example, having a processor 906 and a memory 909, both of which are coupled to a local interface 912. To this end, each computing device 903 may comprise, for example, at least one server computer or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are the electronic commerce application 212, the search engine 215, the list management service 218, and potentially other applications. Also stored in the memory 909 may be a data store 209 and other data. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random-access memory (SRAM), dynamic random-access memory (DRAM), or magnetic random-access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although the electronic commerce application 212, the search engine 215, the list management service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-8 show the functionality and operation of an implementation of portions of the electronic commerce application 212, the search engine 215, the list management service 218, and/or the client application 245. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although the flowcharts of FIGS. 5-8 show a specific order of execution, it is understood that the order of execution may differ from that which is depicted. For example, the order of execution of two or more blocks may be scrambled relative to the order shown. Also, two or more blocks shown in succession in FIGS. 5-8 may be executed concurrently or with partial concurrence. Further, in some embodiments, one or more of the blocks shown in FIGS. 5-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 212, the search engine 215, and the list management service 218, that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random-access memory (SRAM) and dynamic random-access memory (DRAM), or magnetic random-access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 212, the search engine 215, the list management service 218, and the client application 245, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 903, or in multiple computing devices 903 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device;
   at least one application executable by the at least one computing device, wherein, when executed by the at least one computing device, the at least one application causes the at least one computing device to at least:
   receive a request to initiate a shopping experience associated with an item list, the item list comprising a plurality of item list entries, each respective item list entry corresponding to a plurality of user-defined keywords;
   determine one or more shopping parameters associated with the shopping experience, the one or more shopping parameters comprising at least one of an identification of a merchant, a merchant location, or a type of delivery option;
   identify a plurality of item recommendations for each respective item list entry, the plurality of item recommendations corresponding to items available for purchase via the merchant, the identification based at least in part on the plurality of user-defined keywords and the one or more shopping parameters;

rank the plurality of item recommendations for each respective item list entry based at least in part on a plurality of ranking factors, the ranking factors comprising at least one of a user interaction history, an item inventory at a given store, or a popularity of an item, wherein an individual top-ranked item recommendation corresponds to each respective item list entry;

generate a user interface comprising the plurality of item recommendations and an add-to-cart component, each of the plurality of item recommendations including a respective checkbox component, the respective checkbox component being automatically checked for the individual top-ranked item recommendation for each respective item list entry;

cause the user interface to be rendered on a client device; and in response to a user interaction with the add-to-cart component, initiate a purchase of items associated with the plurality of item recommendations having the respective checkbox component checked.

2. The system of claim 1, wherein, when executed, the at least one application further causes the at least one computing device to at least:

generate a search query comprising the plurality of user-defined keywords and the one or more shopping parameters;

send the search query to a search engine; and receive search query results including the plurality of item recommendations, the search query results being based at least in part on the plurality of user-defined keywords, the one or more shopping parameters, and a user interaction history associated with a user account of the item list, and the plurality of item recommendations being identified based at least in part on the search query results.

3. The system of claim 1, wherein an arrangement of the plurality of item recommendations in the user interface is based at least in part on an estimated likelihood of being purchased by a user associated with a user account of the item list, wherein the estimated likelihood of being purchased is based at least in part on the ranking of the item recommendations.

4. A system, comprising:

at least one computing device; and at least one application executable in the at least one computing device, wherein when executed the at least one application causes the at least one computing device to at least:

generate a search query comprising a plurality of keywords included in an item list, the item list comprising a plurality of item list entries, and a respective subset of the keywords corresponding to a respective item list entry of the plurality of item list entries;

identify a plurality of item recommendations for each respective item list entry based at least in part on search results of the search query;

rank the plurality of item recommendations for each respective item list entry based at least in part on a plurality of ranking factors, the ranking factors comprising at least one of a user interaction history, an item inventory at a given store, or a popularity of an item, wherein an individual top-ranked item recommendation corresponds to the respective item list entry;

generate a user interface comprising an add-to-cart component and the plurality of item recommendations, individual item recommendations comprising a respective selection component, the respective selection component being selected for an item recommendation for each respective item list entry;

cause the user interface to be rendered on a client device; and in response to a user interaction, initiate a purchase of items associated with the individual item recommendations having the respective selection component selected.

5. The system of claim 4, wherein, when executed, the at least one application causes the at least one computing device to at least receive a request to initiate a shopping experience in association with the item list, the user interface being generated in response to the request to initiate the shopping experience.

6. The system of claim 5, wherein the request to initiate the shopping experience is received from a voice user interface on the client device in response to a voice command received by the voice user interface.

7. The system of claim 5, wherein the user interface comprises a first user interface, and the request to initiate the shopping experience is received in response to one or more user interactions from a second user interface comprising the item list.

8. The system of claim 4, wherein the item recommendation for each respective item list entry corresponds to a top-ranked item recommendation based at least in part on an estimated likelihood of being purchased by a user associated with a user account of the item list, wherein the estimated likelihood of being purchased is based at least in part on the ranking of the item recommendation.

9. The system of claim 4, wherein when executed, the at least one application causes the at least one computing device to at least identify a selection of the add-to-cart component, the purchase of items being initiated based at least in part on the respective selection component being selected and the selection of the add-to-cart component.

10. The system of claim 4, wherein, when executed, the at least one application causes the at least one computing device to at least modify the item list to reflect a status of the item list entries corresponding to the purchased items.

11. A method, comprising:

generating, via at least one computing device, a search query comprising a plurality of keywords included in an item list, the item list comprising a plurality of item list entries, and a respective subset of the keywords corresponding to a respective item list entry of the plurality of item list entries;

identifying, via at least one computing device, a plurality of item recommendations for each respective item list entry based at least in part on search results of the search query;

ranking, via at least one computing device, the plurality of item recommendations for each respective item list entry based at least in part on a plurality of ranking factors, the ranking factors comprising at least one of a user interaction history, an item inventory at a given store, or a popularity of an item, wherein an individual top-ranked item recommendation corresponds to the respective item list entry;

generating, via at least one computing device, a user interface comprising an add-to-cart component and the plurality of item recommendations, individual item recommendations comprising a respective selection component, the respective selection component being selected for an item recommendation for each respective item list entry;

causing, via at least one computing device, the user interface to be rendered on a client device; and in response to a user interaction, initiating, via at least one computing device, a purchase of items associated with the individual item recommendations having the respective selection component selected.

12. The method of claim 11, further comprising receiving a request to initiate a shopping experience in association with the item list, the user interface being generated in response to the request to initiate the shopping experience.

13. The method of claim 12, wherein the request to initiate the shopping experience is received from a voice user interface on the client device in response to a voice command received by the voice user interface.

14. The method of claim 12, wherein the user interface comprises a first user interface, and the request to initiate the shopping experience is received in response to one or more user interactions from a second user interface comprising the item list.

15. The method of claim 11, wherein the item recommendation for each respective item list entry corresponds to a top-ranked item recommendation based at least in part on an estimated likelihood of being purchased by a user associated with a user account of the item list, wherein the estimated likelihood of being purchased is based at least in part on the ranking of the item recommendation.

16. The method of claim 11, further comprising identifying a selection of the add-to-cart component.

17. The method of claim 16, wherein the purchase of items is initiated based at least in part on the respective selection component being selected and the selection of the add-to-cart component.

18. The method of claim 11, further comprising modifying the item list to reflect a status of the item list entries corresponding to the purchased items.

19. The method of claim 11, wherein the selection of the respective purchase component is detected via a voice user interface.

20. The method of claim 11, wherein the plurality of item recommendations are further identified based at least in part on one or more shopping parameters comprising at least one of an identification of a merchant, a merchant location, or a type of delivery option.

* * * * *